(12) United States Patent
Kautkar et al.

(10) Patent No.: US 11,988,613 B2
(45) Date of Patent: May 21, 2024

(54) CARE AREA BASED DEFECT DETECTION

(71) Applicant: Applied Materials Israel Ltd., Rehovot (IL)

(72) Inventors: Satyajit Kautkar, Bangalore (IN); Sambit Rout, Bengaluru (IN); Sunil Kiran Esetty, Bengaluru (IN); Narasimha Murthy Srinivasa Chandan, Bangalore (IN)

(73) Assignee: Applied Materials Israel Ltd., Rehovot (IL)

( * ) Notice: Subject to any disclaimer, the term of this patent is extended or adjusted under 35 U.S.C. 154(b) by 179 days.

(21) Appl. No.: 17/671,517

(22) Filed: Feb. 14, 2022

(65) Prior Publication Data

US 2023/0258576 A1  Aug. 17, 2023

(51) Int. Cl.
*G01N 21/95* (2006.01)
*G06T 7/00* (2017.01)
*G06T 7/11* (2017.01)
*G01N 21/88* (2006.01)

(52) U.S. Cl.
CPC ....... *G01N 21/9501* (2013.01); *G06T 7/0004* (2013.01); *G06T 7/11* (2017.01); *G01N 2021/8864* (2013.01); *G06T 2207/30148* (2013.01)

(58) Field of Classification Search
CPC ........ G01N 21/9501; G01N 2021/8864; G06T 7/0004; G06T 7/11; G06T 2207/30148
See application file for complete search history.

(56) References Cited

U.S. PATENT DOCUMENTS

| | | | |
|---|---|---|---|
| 8,437,534 B2 * | 5/2013 | Shibuya | G01N 21/956 700/28 |
| 8,811,712 B2 * | 8/2014 | Maeda | G06T 7/001 382/141 |
| 11,562,476 B2 * | 1/2023 | Peleg | G06T 7/0006 |
| 11,816,411 B2 * | 11/2023 | Chou | G06T 7/001 |

* cited by examiner

*Primary Examiner* — Hung V Nguyen
(74) *Attorney, Agent, or Firm* — Lowenstein Sandler LLP

(57) ABSTRACT

There is provided a system and method of assisting defect detection on a semiconductor specimen. The method includes obtaining a first map informative of multiple care areas (CAs) to be inspected on a die; creating a plurality of bounding rectangles (BRs) enclosing the multiple CAs; and compacting the plurality of BRs to a set of compacted rectangles to meet a predefined inspection capacity while attempting to minimize a non-CA area enclosed by the set of compacted rectangles, giving rise to a second map informative of the set of compacted rectangles. The compaction comprises constructing an R-tree structure representative of the plurality of BRs and compacted rectangles, and selecting a set of nodes from the R-tree structure based on the predefined inspection capacity and representative of the set of compacted rectangles. The second map is usable for filtering a defect map indicative of defect candidate distribution on the die.

20 Claims, 7 Drawing Sheets

CARE AREA BASED DEFECT DETECTION

TECHNICAL FIELD

The presently disclosed subject matter relates, in general, to the field of inspection of a semiconductor specimen, and, more specifically, to defect detection based on care areas (CAs).

BACKGROUND

Current demands for high density and performance associated with ultra large-scale integration of fabricated devices require submicron features, increased transistor and circuit speeds, and improved reliability. As semiconductor processes progress, pattern dimensions such as line width, and other types of critical dimensions, are continuously shrunken. Such demands require formation of device features with high precision and uniformity, which, in turn, necessitates careful monitoring of the fabrication process, including automated examination of the devices while they are still in the form of semiconductor wafers.

Run-time examination can employ a two-phase procedure, e.g., inspection of a specimen followed by review of sampled locations of potential defects. Examination generally involves generating certain output (e.g., images, signals, etc.) for a specimen by directing light or electrons to the wafer and detecting the light or electrons from the wafer. During the first phase, the surface of a specimen is inspected at high-speed and relatively low-resolution. Defect detection is typically performed by applying a defect detection algorithm to the inspection output. A defect map is produced to show suspected locations on the specimen having high probability of a defect. During the second phase, at least some of the suspected locations are more thoroughly analyzed with relatively high resolution.

Examination can be provided by using non-destructive examination tools during or after manufacture of the specimen to be examined. A variety of non-destructive examination tools includes, by way of non-limiting example, scanning electron microscopes, atomic force microscopes, optical inspection tools, etc. In some cases both the two phases can be implemented by the same inspection tool, and, in some other cases, these two phases are implemented by different inspection tools.

Inspection processes are used at various steps during semiconductor fabrication to detect defects on specimens and promote higher yield. Very often, the goal of inspection is to provide high sensitivity to detection of defects of interest (which, if uncorrected, may cause the final device to fail to meet the desired performance or malfunction, thus adversely affecting yield), while increasing the effectivity of suppressing false alarms/nuisances and noises from the detection result.

Effectiveness of inspection can be improved by utilizing certain assisting process(es). Care areas refers to certain portions of a specimen that are of particular interest to be inspected. In some cases, care areas can be used to differentiate areas on a specimen that are to be inspected in different ways. Care areas can be used to facilitate defect detection and noise suppression.

SUMMARY

In accordance with certain aspects of the presently disclosed subject matter, there is provided a computerized system of assisting defect detection on a semiconductor specimen, the system comprising a processing and memory circuitry (PMC) configured to: obtain a first map informative of multiple care areas (CAs) to be inspected on a die of the semiconductor specimen; create a plurality of bounding rectangles (BRs) enclosing the multiple CAs; and compact the plurality of BRs to a set of compacted rectangles to meet a predefined inspection capacity while attempting to minimize a non-CA area enclosed by the set of compacted rectangles, giving rise to a second map informative of the set of compacted rectangles, wherein the compacting comprises: constructing a R-tree structure comprising a bottom layer and one or more upper layers, the bottom layer comprising a plurality of leaf nodes representative of the plurality of BRs, each of the one or more upper layers comprising one or more non-leaf nodes, each given non-leaf node representative of a compacted rectangle enclosing one or more rectangles represented by one or more child nodes of the given non-leaf node, and selecting a set of nodes from the leaf nodes and the non-leaf nodes of the R-tree structure based on the predefined inspection capacity, the set of nodes representative of the set of compacted rectangles; wherein the second map is usable for filtering a defect map indicative of defect candidate distribution on the die.

In addition to the above features, the system according to this aspect of the presently disclosed subject matter can comprise one or more of features (i) to (x) listed below, in any desired combination or permutation which is technically possible:

(i). The first map can be derived based on design data of the die.

(ii). The plurality of BRs can be created by dividing the first map into multiple grid cells in accordance with a grid, giving rise to a plurality of grid cells each containing at least one CA or part thereof, and for each grid cell of the plurality of grid cells, approximating a bounding rectangle (BR) enclosing the at least one CA or part thereof in the grid cell, giving rise to the plurality of BRs corresponding to the plurality of grid cells.

(iii). The R-tree structure can be constructed by sequentially inserting the plurality of BRs into the bottom layer in accordance with an order, and forming the one or more upper layers of non-leaf nodes based on the number of child nodes of each non-leaf node while taking into consideration least enlargement of the non-CA area covered by individual non-leaf nodes upon being constructed.

(iv). The order can be defined by associating each of the multiple grid cells with a unique index, and assigning the unique index of a grid cell of the plurality of grid cells to the BR thereof. The plurality of BRs can be inserted into the bottom layer in accordance with the unique index thereof (v). The unique index can be a Hilbert index derived in accordance with a Hilbert curve traversing the plurality of grid cells.

(vi). The set of nodes can be selected by selecting a given layer of the R-tree where a total number of nodes thereof is within the inspection capacity, placing the nodes of the given layer in the set, consuming remaining capacity by selecting one or more nodes from the nodes of the given layer based on a purity thereof, and replacing each of the selected nodes from the set with one or more child nodes thereof, wherein the nodes of the given layer except for the selected nodes, and the child nodes of the selected nodes, constitute the set of nodes.

(vii). The set of nodes can be selected across multiple layers of the R-tree so as to optimize total purity of the selected set of nodes.

(viii). The set of nodes can be selected by starting from an upper layer, placing one or more nodes of the upper layer into the priority queue, replacing a node having a lowest purity among the one or more nodes with one or more child nodes thereof, and repeating the replacing until the number of nodes in the priority queue meets the inspection capacity.

(ix). The R-tree structure can be a balanced binary tree in which each non-leaf node has at most two child nodes.

(x). The PMC is further configured to filter the defect map by aligning the second map with the defect map and extracting one or more defect candidates falling within the set of compacted rectangles to form a filtered defect map. The filtered defect map is usable for defect review by a review tool.

In accordance with other aspects of the presently disclosed subject matter, there is provided a method of assisting defect detection on a semiconductor specimen, the method performed by a processing and memory circuitry (PMC) and comprising: obtaining a first map informative of multiple care areas (CAs) to be inspected on a die; creating a plurality of bounding rectangles (BRs) enclosing the multiple CAs; and compacting the plurality of BRs to a set of compacted rectangles to meet a predefined inspection capacity while attempting to minimize a non-CA area enclosed by the set of compacted rectangles, giving rise to a second map informative of the set of compacted rectangles. The compaction comprises constructing a R-tree structure comprising a bottom layer and one or more upper layers, the bottom layer comprising a plurality of leaf nodes representative of the plurality of BRs, each of the one or more upper layers comprising one or more non-leaf nodes, each given non-leaf node representative of a compacted rectangle enclosing one or more rectangles represented by one or more child nodes of the given non-leaf node, and selecting a set of nodes from the leaf nodes and the non-leaf nodes of the R-tree structure based on the predefined inspection capacity, the set of nodes representative of the set of compacted rectangles. The second map is usable for filtering a defect map indicative of defect candidate distribution on the die.

This aspect of the disclosed subject matter can comprise one or more of features (i) to (x) listed above with respect to the system, mutatis mutandis, in any desired combination or permutation which is technically possible.

In accordance with other aspects of the presently disclosed subject matter, there is provided a non-transitory computer readable medium comprising instructions that, when executed by a computer, cause the computer to perform a method of assisting defect detection on a semiconductor specimen, the method comprising: obtaining a first map informative of multiple care areas (CAs) to be inspected on a die; creating a plurality of bounding rectangles (BRs) enclosing the multiple CAs; and compacting the plurality of BRs to a set of compacted rectangles to meet a predefined inspection capacity while attempting to minimize a non-CA area enclosed by the set of compacted rectangles, giving rise to a second map informative of the set of compacted rectangles. The compaction comprises constructing a R-tree structure comprising a bottom layer and one or more upper layers, the bottom layer comprising a plurality of leaf nodes representative of the plurality of BRs, each of the one or more upper layers comprising one or more non-leaf nodes, each given non-leaf node representative of a compacted rectangle enclosing one or more rectangles represented by one or more child nodes of the given non-leaf node, and selecting a set of nodes from the leaf nodes and the non-leaf nodes of the R-tree structure based on the predefined inspection capacity, the set of nodes representative of the set of compacted rectangles. The second map is usable for filtering a defect map indicative of defect candidate distribution on the die.

This aspect of the disclosed subject matter can comprise one or more of features (i) to (x) listed above with respect to the system, mutatis mutandis, in any desired combination or permutation which is technically possible.

BRIEF DESCRIPTION OF THE DRAWINGS

In order to understand the disclosure and to see how it may be carried out in practice, embodiments will now be described, by way of non-limiting example only, with reference to the accompanying drawings, in which.

DETAILED DESCRIPTION OF THE DRAWINGS

Figure 1:
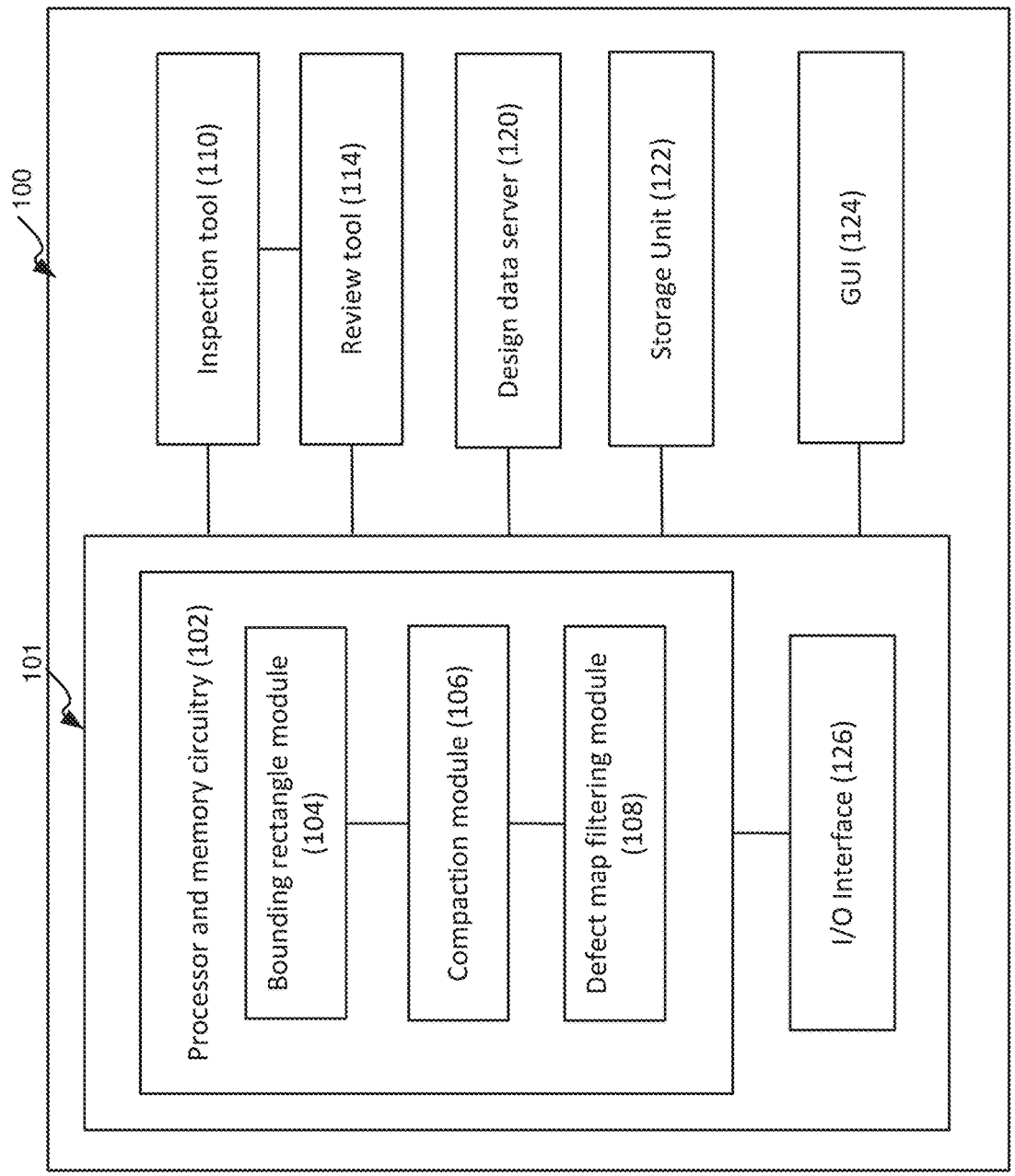
FIG. 1 illustrates a functional block diagram of an examination system for examining a semiconductor specimen and a sub-system for assisting defect detection in accordance with certain embodiments of the presently disclosed subject matter.

In the following detailed description, numerous specific details are set forth in order to provide a thorough understanding of the disclosure. However, it will be understood by those skilled in the art that the presently disclosed subject matter may be practiced without these specific details. In other instances, well-known methods, procedures, components and circuits have not been described in detail so as not to obscure the presently disclosed subject matter.

Unless specifically stated otherwise, as apparent from the following discussions, it is appreciated that throughout the specification discussions utilizing terms such as "assisting", "obtaining", "compacting", "constructing", "selecting", "filtering", "dividing", "approximating", "inserting", "forming", "associating", "assigning", "placing", "consuming", "replacing", "aligning", "extracting" or the like, refer to the action(s) and/or process(es) of a computer that manipulate and/or transform data into other data, said data represented as physical, such as electronic, quantities and/or said data representing the physical objects. The term "computer" should be expansively construed to cover any kind of hardware-based electronic device with data processing capabilities including, by way of non-limiting example, the examination system, the sub-system for assisting defect detection, and respective parts thereof disclosed in the present application.

The terms "non-transitory memory" and "non-transitory storage medium" used herein should be expansively construed to cover any volatile or non-volatile computer memory suitable to the presently disclosed subject matter. The terms should be taken to include a single medium or multiple media (e.g., a centralized or distributed database, and/or associated caches and servers) that store the one or more sets of instructions. The terms shall also be taken to include any medium that is capable of storing or encoding a set of instructions for execution by the computer and that cause the computer to perform any one or more of the methodologies of the present disclosure. The terms shall accordingly be taken to include, but not be limited to, a read only memory ("ROM"), random access memory ("RAM"), magnetic disk storage media, optical storage media, flash memory devices, etc.

The term "specimen" used in this specification should be expansively construed to cover any kind of physical objects or substrates including wafers, masks, reticles, and other structures, combinations and/or parts thereof used for manufacturing semiconductor integrated circuits, magnetic heads, flat panel displays, and other semiconductor-fabricated articles. A specimen is also referred to herein as a semiconductor specimen, and can be produced by manufacturing equipment executing corresponding manufacturing processes.

The term "examination" used in this specification should be expansively construed to cover any kind of operations related to defect detection, defect review and/or defect classification of various types, and/or metrology operations during and/or after the specimen fabrication process. Examination is provided by using non-destructive examination tools during or after manufacture of the specimen to be examined. By way of non-limiting example, the examination process can include runtime scanning (in a single or in multiple scans), imaging, sampling, detecting, reviewing, measuring, classifying and/or other operations provided with regard to the specimen or parts thereof, using the same or different inspection tools. Likewise, examination can be provided prior to manufacture of the specimen to be examined, and can include, for example, generating an examination recipe(s) and/or other setup operations. It is noted that, unless specifically stated otherwise, the term "examination" or its derivatives used in this specification are not limited with respect to resolution or size of an inspection area. A variety of non-destructive examination tools includes, by way of non-limiting example, scanning electron microscopes (SEM), atomic force microscopes (AFM), optical inspection tools, etc.

The term "defect" used in this specification should be expansively construed to cover any kind of abnormality or undesirable feature/functionality formed on a specimen. In some cases, a defect may be a defect of interest (DOI) which is a real defect that has certain effects on the functionality of the fabricated device, thus is in the customer's interest to be detected. For instance, any "killer" defects that may cause yield loss can be indicated as a DOI.

In some other cases, a defect may be a nuisance (also referred to as "false alarm" defect) which refers to an unwanted or not-of-interest defect that does not impact yield, and therefore should be disregarded because it has no effect on the functionality of the completed device.

The term "defect candidate" used in this specification should be expansively construed to cover a suspected defect location on the specimen which is detected to have relatively high probability of being a defect of interest (DOI). Therefore, a defect candidate, upon being reviewed, may actually be a DOI, or, in some other cases, it may be a nuisance as described above, or random noise that can be caused by different variations (e.g., process variation, color variation, mechanical and electrical variations, etc.) during inspection.

The term "design data" used in the specification should be expansively construed to cover any data indicative of hierarchical physical design (layout) of a specimen. Design data can be provided by a respective designer and/or can be derived from the physical design (e.g., through complex simulation, simple geometric and Boolean operations, etc.). Design data can be provided in different formats as, by way of non-limiting examples, GDSII format, OASIS format, etc. Design data can be presented in vector format, grayscale intensity image format, or otherwise.

It is appreciated that, unless specifically stated otherwise, certain features of the presently disclosed subject matter, which are described in the context of separate embodiments, can also be provided in combination in a single embodiment. Conversely, various features of the presently disclosed subject matter, which are described in the context of a single embodiment, can also be provided separately or in any suitable sub-combination. In the following detailed description, numerous specific details are set forth in order to provide a thorough understanding of the methods and apparatus.

Bearing this in mind, attention is drawn to FIG. 1 illustrating a functional block diagram of an examination system for examining a semiconductor specimen and a sub-system for assisting defect detection in accordance with certain embodiments of the presently disclosed subject matter.

The examination system 100 illustrated in FIG. 1 can be used for examination of a semiconductor specimen (e.g., a wafer, a die and/or parts thereof) as a part of the specimen fabrication (FAB) process. As described above, the examination referred to herein can be construed to cover any kind of operations related to defect inspection and detection, defect classification of various types, and/or metrology operations with respect to the specimen or parts thereof. According to certain embodiments of the presently disclosed subject matter, the illustrated examination system 100 comprises a computer-based system 101 capable of assisting/ optimizing defect detection on a specimen.

The examination system 100 can include one or more examination tools configured to capture images and/or to review the captured image(s) and/or to enable or provide measurements related to the captured image(s).

The term "examination tool(s)" used herein should be expansively construed to cover any tools that can be used in examination-related processes, including, by way of non-limiting example, imaging, scanning (in a single or in multiple scans), sampling, reviewing, measuring, classifying and/or other processes provided with regard to the specimen or parts thereof. Examination tools can include inspection tool(s) and/or review tool(s). An inspection tool is configured to scan a specimen (e.g., an entire wafer, an entire die or portions thereof) to capture inspection images (typically, at relatively high-speed and/or low-resolution) for detection of potential defects. A review tool is configured to capture review images of at least some of the defects detected by the inspection tool(s) for ascertaining whether a potential defect is indeed a defect. Such a review tool is usually configured to inspect fragments of a die, one at a time (typically, at relatively low-speed and/or high-resolution). The inspection tool and the review tool can be different tools located at the same or at different locations, or a single tool operating in two different modes. In some cases, at least one examination tool can have metrology capabilities.

According to certain embodiments, the examination system 100 can include one or more inspection tools 110 and/or one or more review tools 114 as illustrated in FIG. 1. Specifically, the inspection tool 110 can scan the specimen to capture inspection images and detect potential defects in accordance with a defect detection algorithm. The output of the defect detection is a defect map indicative of defect candidate distribution on the semiconductor specimen. In some cases, a list of defect candidates can be selected, e.g., by a defect classifier and/or a nuisance filter, from the defect map as candidates having higher probability to be defects of interest (DOI).

The list of defect candidates as selected can be provided to the review tool 114. The review tool 114 is configured to capture review images at locations of the respective defect candidates in the list, and review the review images for ascertaining whether a defect candidate is indeed a DOI. The output of the review tool can include label data respectively associated with the list of defect candidates, the label data informative of types of the defect candidates.

Without limiting the scope of the disclosure in any way, it should also be noted that the inspection tool(s) 110 and/or the review tool(s) 114 can be implemented as examination machines of various types, such as optical imaging machines, electron beam machines, and so on. In some cases, the same examination tool can provide low-resolution image data and high-resolution image data.

As aforementioned, the examination system 100 comprises a computer-based system 101 capable of assisting/ optimizing defect detection on a specimen based on care areas of the specimen. Care areas (CAs) refer to specific portions of a specimen that are of particular interest/importance to be inspected. For instance, care areas can be represented as polygons on a map and used as masks to be applied on inspection images and/or defect maps of the specimen to indicate which areas are to be inspected to detect defects. In some cases, care areas can be used to differentiate areas on a specimen that are to be inspected in different ways, e.g., by using different inspection parameters, such as detection sensitivity, threshold, etc. Therefore, care areas can be used to facilitate the processes of detection of DOIs and nuisance/noise suppression. By way of example, a map of CAs can be used to filter the defect map of a specimen so as to keep only the defect candidates falling within the area of the CAs for further review.

Care areas, or a map of CAs, can be generated in various ways. For instance, the CA map can be derived based on design data of the specimen, e.g., the chip design patterns printed on the specimen. The care areas can be derived manually by a user or automatically, by using certain scripts and/or tools so as to extract specific areas, e.g., covering patterns of interest or locations of interest. As these areas are derived from chip designs, they can provide high precision to inspection tools for assisting defect detection. However, as care areas are usually derived in tiny sizes and high volumes (e.g., in terms of millions or billions of polygons from a die), the amount of data representative of the CAs often exceeds the inspection budget/capacity of the inspection tools.

The terms "inspection budget" and "inspection capacity" are used interchangeably to refer to a limitation of the number of care areas (or the amount of data representative of the care areas) that can be handled by the inspection tool due to tool limitations, such as memory, storage and/or processing constraints. By way of example, each care area can be stored in the storage by data representative of its coordinates in the map and the dimensions thereof. A map having millions or billions of care areas would necessarily consume a lot of system storage space and require considerably high processing power to read and process the data, which often go beyond the inspection capacity of the inspection tool.

Thus, there is a need to compact/group the large number of care areas to a relatively smaller set of compacted regions (which require less system storage and processing) so as to meet the inspection capacity of the tool. However, as the care areas which are originally derived in small sizes will be compacted into compacted regions with larger sizes (e.g., each compacted region encloses one or more care areas), the compacted regions would unavoidably include non-CA areas which, originally, were not intended to be inspected. Therefore, a map of compacted regions including such non-CA areas, when being used to filter the defect map, would cause increment of false alarms/nuisances falling within these areas. Detection of such false alarms/nuisances is disadvantageous for various reasons. For instance, these nuisances may need to be further filtered out of the detection results by additional post-processing of the defect map. In addition, nuisance detection may limit the ultimate achievable sensitivity of the inspection system for specific applications. The increment of nuisances may also overload the run time processing capacity of the inspection system, thereby reducing throughput and/or causing yield loss.

According to certain embodiments of the presently disclosed subject matter, system 101 is configured for efficient compaction of care areas of a specimen. The compaction can effectively meet the inspection capacity constraint of the inspection tool, while attempting to minimize the non-CA areas so as to eventually reduce false alarms/nuisances of the defect map that fall within these areas.

System 101 includes a processor and memory circuitry (PMC) 102 (also referred to as a processing unit) operatively connected to a hardware-based I/O interface 126. PMC 102 is configured to provide necessary processing for operating the system 101 as further detailed with reference to FIGS. 2-6 and comprises a processor (not shown separately) and a memory (not shown separately). The processor of PMC 102 can be configured to execute several functional modules in accordance with computer-readable instructions implemented on a non-transitory computer-readable memory comprised in the PMC. Such functional modules are referred to hereinafter as comprised in the PMC.

According to certain embodiments, functional modules comprised in the PMC 102 can include a bounding rectangle (BR) module 104, a compaction module 106, and optionally, a defect map filtering module 108. The PMC 102 can be configured to obtain, via the I/O interface 126, a first map informative of multiple care areas (CAs) to be inspected on a die of the semiconductor specimen. The first map (also referred to as a CA map) can be received, e.g., from a design data server 120 configured to store the design data of the semiconductor specimen or part thereof.

The BR module 104 can be configured to create a plurality of bounding rectangles (BRs) enclosing the multiple CAs. The compaction module 106 can be configured to compact the plurality of BRs to a set of compacted rectangles to meet a predefined inspection capacity while attempting to minimize the non-CA area enclosed by the set of compacted rectangles, giving rise to a second map informative of the set of compacted rectangles. The compaction can comprise R-tree construction and node selection. Specifically, a R-tree structure as constructed comprises a bottom layer and one or more upper layers. The bottom layer comprises a plurality of leaf nodes representative of the plurality of BRs. Each of the one or more upper layers comprises one or more non-leaf nodes. Each given non-leaf node is representative of a compacted rectangle enclosing one or more rectangles represented by one or more child nodes of the given non-leaf node. A set of nodes are selected from the leaf nodes and the non-leaf nodes of the R-tree structure based on the predefined inspection capacity. The set of nodes are representative of the set of compacted rectangles.

The second map informative of the set of compacted rectangles is usable, e.g., by the defect map filtering module 108, or by the inspection tool 110, for filtering a defect map indicative of defect candidate distribution on the die.

It is to be noted that the term "first" as used throughout the specification, figures and claims, does not mean the very first instance, etc. Rather it is used to distinguish from a "second" instance, etc. By way of example, the second map is a map that is generated based on the first map, thus being different from the first map.

Operation of system 100, system 101, PMC 102 and the functional modules therein will be further detailed with reference to FIGS. 2-6.

According to certain embodiments, system 100 can comprise a storage unit 122. The storage unit 122 can be configured to store any data necessary for operating system 101, e.g., data related to input and output of system 101, as well as intermediate processing results generated by system 101. By way of example, the storage unit 122 can be configured to store CA map(s) received from the design data server, and/or defect map(s) of a specimen as produced by the inspection tool, and/or the second map informative of the set of compacted rectangles, and/or filtered defect map(s) generated using the second map, etc. Accordingly, the stored input data can be retrieved from the storage unit 122 and provided to the PMC 102 for further processing, and the output data from PMC 102 can be transmitted to the storage unit 122 whenever needed.

In some embodiments, system 101 can optionally comprise a computer-based graphical user interface (GUI) 124 which is configured to enable user-specified inputs and/or render processing outputs related to system 101. For instance, the user can be presented with a visual representation of the first map of care areas (for example, by a display forming part of GUI 124). Optionally, the user may be provided, through the GUI, with options of defining certain operation parameters, such as, e.g., the inspection capacity of the inspection tool, the R-tree structure parameters, etc. The user may also view certain operation results, such as, e.g., the second map, the defect map, the filtered defect map, etc., on the GUI. In some cases, system 101 can be further configured to send, via I/O interface 126, the second map to the inspection tool 110 for filtering the defect map. In some cases, system 101 can be further configured to send some of the results to the storage unit 122, and/or external systems (e.g. Yield Management System (YMS) of a FAB).

According to certain embodiments, additionally to system 101, the examination system 100 can further comprise one or more examination modules, such as, e.g., defect detection module(s) and/or Automatic Defect Review Module (ADR) and/or Automatic Defect Classification Module (ADC) and/or metrology-related module and/or other modules which are usable for performing examination of a semiconductor specimen. The one or more examination modules can be implemented as stand-alone computers, or their functionalities (or at least some thereof) can be integrated with the inspection tool 110 and/or the review tool 114. In some embodiments, the output as obtained from system 101 can be used by the inspection tool 110 and/or the review tool 114 and/or the one or more examination modules (or part thereof) for further examination of the semiconductor specimen.

Those versed in the art will readily appreciate that the teachings of the presently disclosed subject matter are not bound by the system illustrated in FIG. 1; equivalent and/or modified functionality can be consolidated or divided in another manner and can be implemented in any appropriate combination of software with firmware and/or hardware.

It is noted that the system illustrated in FIG. 1 can be implemented in a distributed computing environment, in which the aforementioned functional modules as comprised in the PMC 102 and/or the components as shown in FIG. 1 can be distributed over several local and/or remote devices, and can be linked through a communication network. It is further noted that in various embodiments, one or more of the inspection tool 110, the review tool 114, the design data server 120, the storage unit 122 and/or GUI 124 can be internal or external to the system 101 and operate in data communication with system 101 via I/O interface 126 whenever needed. System 101 can be implemented as stand-alone computer(s) to be used in conjunction with the examination tools. Alternatively, in some cases, the respective functions of the system 101 can, at least partly, be integrated with one or more examination tools, thereby facilitating and enhancing the functionalities of the examination tools in examination related processes.

While not necessarily so, the process of operation of systems 101 and 100 can correspond to some or all of the stages of the methods described with respect to FIGS. 2-6. Likewise, the methods described with respect to FIGS. 2-6 and their possible implementations can be implemented by systems 101 and 100. It is therefore noted that embodiments discussed in relation to the methods described with respect to FIGS. 2-6 can also be implemented, mutatis mutandis as various embodiments of the systems 101 and 100, and vice versa.

Figure 2:
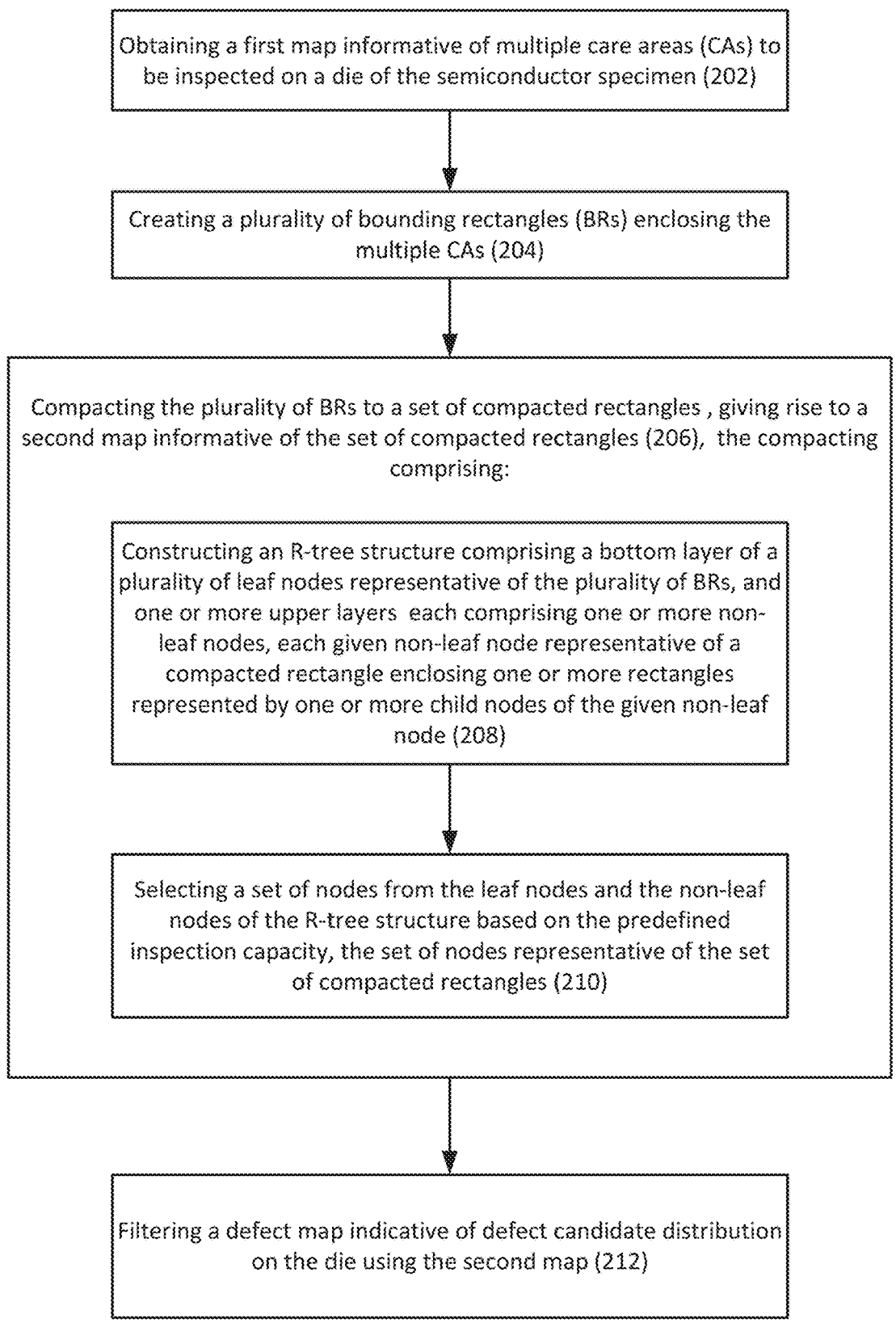
FIG. 2 illustrates a generalized flowchart of assisting defect detection on a semiconductor specimen in accordance with certain embodiments of the presently disclosed subject matter.

Referring to FIG. 2, there is illustrated a generalized flowchart of assisting defect detection on a semiconductor specimen in accordance with certain embodiments of the presently disclosed subject matter.

A first map informative of multiple care areas (CA) to be inspected on a die of the semiconductor specimen can be obtained (202) (e.g., by the PMC 102 in system 101). As described above, care areas (CA) refer to specific regions of a specimen that are of particular interest/importance to be inspected. In some embodiments, the first map (also referred to herein as a CA map) can be derived based on design data of the die. For instance, the CA areas can be identified (either manually by a user or automatically by a script/tool) as areas covering specific patterns of interest and/or locations of interest, etc.

Figure 7:
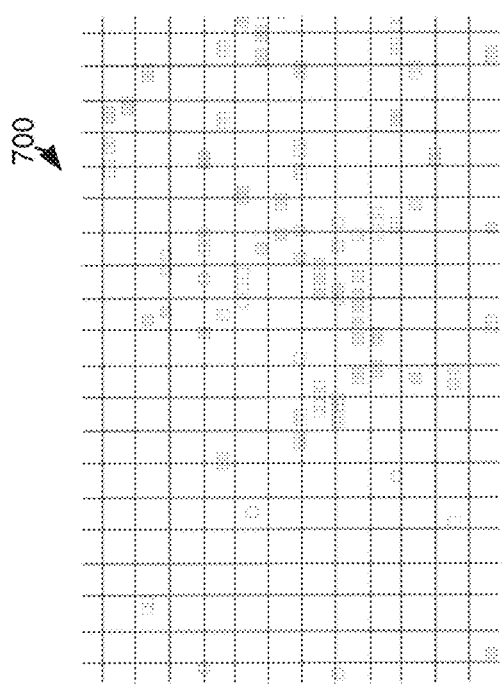
FIG. 7 illustrates an example of a portion of a CA map in accordance with certain embodiments of the presently disclosed subject matter.

FIG. 7 illustrates an example of a portion of a CA map in accordance with certain embodiments of the presently disclosed subject matter. As shown, the care areas in the CA map 700 can be represented as polygons (e.g., rectangles) of various sizes. By way of example, the CA map 700 can be stored in the storage unit as data representative of the coordinates of each given care area in the map and/or the dimensions of the given care area. For instance, a CA in the shape of a rectangle can be represented by the x and y coordinates of one vertex, and the length and width dimensions of the rectangle, or alternatively by the x and y coordinates of two vertices of the rectangle.

As the care areas are normally derived in large quantity from high precision design data, millions or billions of CAs would result in a huge amount of representative data to be stored and processed which often exceeds the inspection capacity of the inspection tool. Certain embodiments of the present disclosure propose a method and system for compacting/grouping such care areas to a relatively small number of compacted regions using a unique tree structure (e.g., R-tree), so as to effectively meet the inspection capacity of the inspection tool while attempting to minimize the non-CA areas which are unavoidably included in the compacted regions, so as to reduce false alarms/nuisances falling within these regions, as described above.

R-tree is a tree data structure that is generally used for spatial access purposes in geographical coordinate systems and navigation systems. The "R" in R-tree stands for rectangle. R-tree is used to group nearby objects and represent them with their minimum bounding rectangle in the next higher level of the tree. At the leaf layer, each rectangle describes a single object, while at higher layers an aggregation rectangle represents an increasing number of objects. R-tree is often constructed for optimizing spatial queries of certain objects within the tree (i.e., to retrieve objects quickly and efficiently according to their spatial locations) by determining which subtree(s) to search for.

Certain embodiments of the present disclosure propose an unconventional use of the R-tree structure for different purposes. Specifically, the R-tree is used in a specific application of care area compaction for the purposes of assisting semiconductor specimen examination. The R-tree is constructed in a specific way to represent the care areas of a CA map and the compactions thereof, and the compacted regions/rectangles are specifically selected from the constructed tree. Both the tree construction process, and as well as selection of the compacted rectangles from the tree, are specifically configured so as to optimize inclusion of the non-CA area (e.g., attempting to minimize the size of the non-CA area) while meeting the inspection capacity of the inspection tool, as described below in further detail with reference to FIGS. 2-6.

Figure 3:
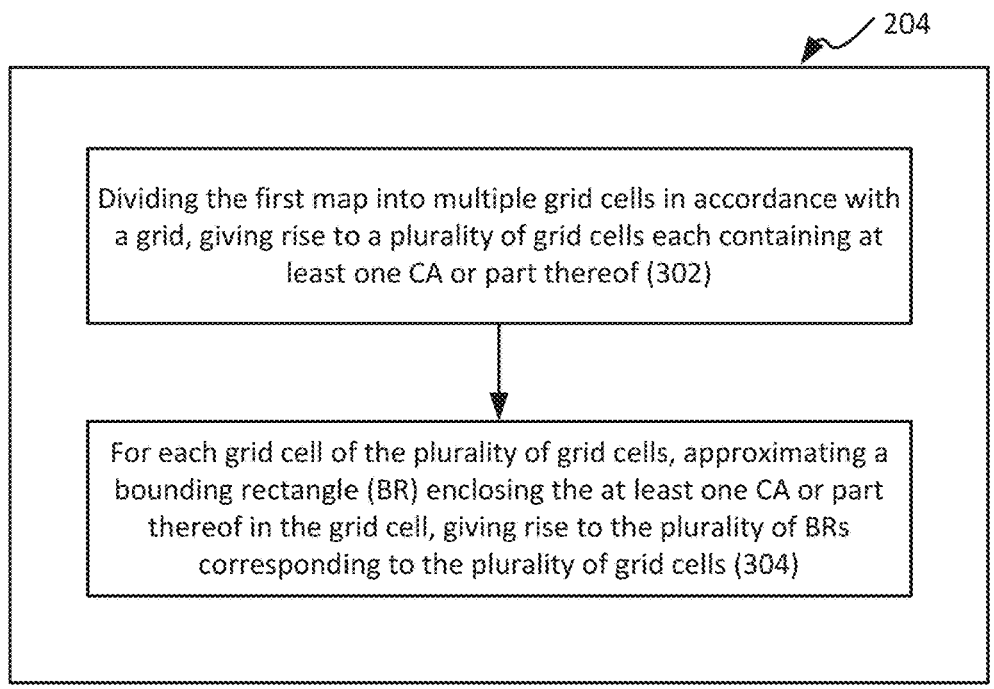
FIG. 3 illustrates a generalized flowchart of an exemplified process of creating the plurality of bounding rectangles (BRs) in accordance with certain embodiments of the presently disclosed subject matter.

A plurality of bounding rectangles (BRs) can be created (204) (e.g., by the bounding rectangle module 104 in PMC 102) to enclose the multiple CAs. The bounding rectangles can be created in various ways and the present disclosure is not limited by a specific implementation thereof. By way of example, each CA can be enclosed by a respective BR. By way of another example, a BR can be derived to enclose a plurality of CAs that are in the vicinity of each other. FIG. 3 illustrates a generalized flowchart of an exemplified process of creating the plurality of bounding rectangles (BR) in accordance with certain embodiments of the presently disclosed subject matter.

Figure 8:
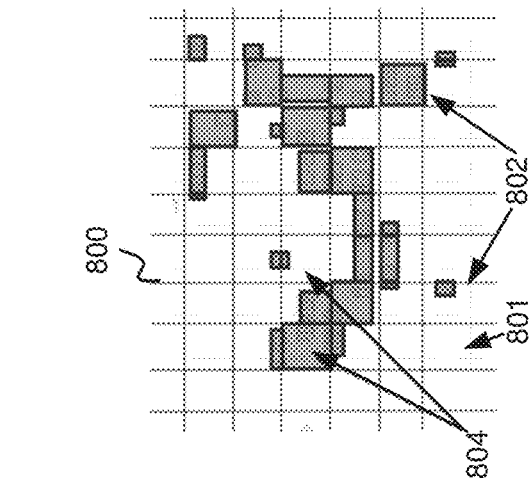
FIG. 8 illustrates an example of a plurality of BRs in accordance with certain embodiments of the presently disclosed subject matter.

Specifically, the first map (i.e., the CA map) can be divided (302) into multiple grid cells in accordance with a grid, giving rise to a plurality of grid cells, each containing at least one CA or part thereof. For each grid cell of the plurality of grid cells, a bounding rectangle (BR) can be approximated (304) to enclose the at least one CA or part thereof in the grid cell, giving rise to the plurality of BRs corresponding to the plurality of grid cells. An example of a plurality of BRs derived as described above is illustrated in FIG. 8 in accordance with certain embodiments of the presently disclosed subject matter.

As shown, a grid 800 is applied on a CA map (only a portion of the map is shown for illustrative purposes) which divides the CA map into multiple grid cells. Upon the division, some grid cells may be empty, as there are no care areas within these cells, such as cell 801. Some grid cells may contain one or more CAs, such as cells 802, while some grid cells may contain one or more partial CAs (sometimes in addition to one or more complete CAs), in cases where certain CAs cross two or more grid cells, such as cells 804. For each non-empty grid cell (i.e., a grid cell that contains at least one CA or part thereof), a bounding rectangle (BR) is approximated to enclose any CA or part thereof that is within the grid cell. By way of example, in cases where there are one or more complete CAs in a grid cell, such as in cells 802, the BR can be approximated as a minimum (or nearly minimum) rectangle that can enclose the one or more CAs (e.g., some parts of the edges of the BR may contour certain edges of the CAs). In cases where there are one or more partial CAs in a grid cell, such as in cells 804, the BR can be approximated as the minimum (or nearly minimum) rectangle that encloses the partial CAs within the cell (e.g., part of the edges of the BR can contour the border of the grid cell which these CAs cross) and additional CAs (if any) in the grid cell.

In some cases, the size of the grid/grid cells can be pre-determined based on certain factors such as, e.g., memory limitation of system 101 (for storing the BRs to be processed), and a purity requirement of the compaction, etc. For instance, the finer the grid is, the better the purity (as defined in further detail below) of the BRs will be, as the approximated BRs will contain less empty area (i.e., non-CA area) in finer grid cells.

The plurality of BRs can be compacted (206) (e.g., by the compaction module 106 in PMC 102) to a set of compacted rectangles to meet a predefined inspection capacity while attempting to minimize the non-CA area enclosed by the set of compacted rectangles, giving rise to a second map informative of the set of compacted rectangles.

It is to be noted that the terms "minimum", "minimize" or "minimized" used in the present disclosure should be broadly interpreted to cover the exact minimal/minimum condition or a nearly minimal/minimum condition (e.g., which is close to the exact minimum to a certain extent (the extent can be defined by a certain percentage/threshold)). For instance, the minimum rectangle as mentioned above can be the rectangle that exactly bounds the edges of the CAs thus covering minimum space, or it can be a bounding rectangle of the CAs that is slightly larger in size (to an extent) relative to the exact minimum rectangle. The attempt to minimize the non-CA area as described above can be construed as aiming for a minimized non-CA area or a nearly minimized non-CA area (to an extent).

Specifically, the compaction can comprise a R-tree construction process (208) and a node selection process (210). An R-tree structure as constructed (208) comprises a bottom layer and one or more upper layers. The bottom layer comprises a plurality of leaf nodes representative of the plurality of BRs (as created with reference to block 204). Each of the one or more upper layers comprises one or more non-leaf nodes. Each given non-leaf node is representative of a compacted rectangle enclosing one or more rectangles represented by one or more child nodes of the given non-leaf node. Once the R-tree is constructed, a set of nodes can be selected (210) from the leaf nodes and the non-leaf nodes of the R-tree structure based on the predefined inspection capacity. The set of nodes are representative of the set of compacted rectangles.

The R-tree is a balanced tree structure and can be constructed in various ways. By way of example, the R-tree can be built by a dynamic approach, e.g., when the BRs are encountered, they are inserted into the tree. For instance, the plurality of BRs can be inserted into the tree sequentially and the R-tree can be built in a bottom-up manner. By way of another example, the R-tree can be built by a static approach, e.g., the tree will only be built once all the BRs are available. For instance, the plurality of BRs can be bulk-loaded into the tree, and the tree can be built in a bottom-up manner, or a top-down manner (e.g., by using node splitting algorithms). The R-tree can be constructed with a different number of child nodes for the non-leaf nodes. By way of example, an R-tree can be a binary tree, where each non-leaf node has at most two child nodes. By way of another example, an R-tree can be constructed with another number of child nodes for each non-leaf node.

Figure 4:
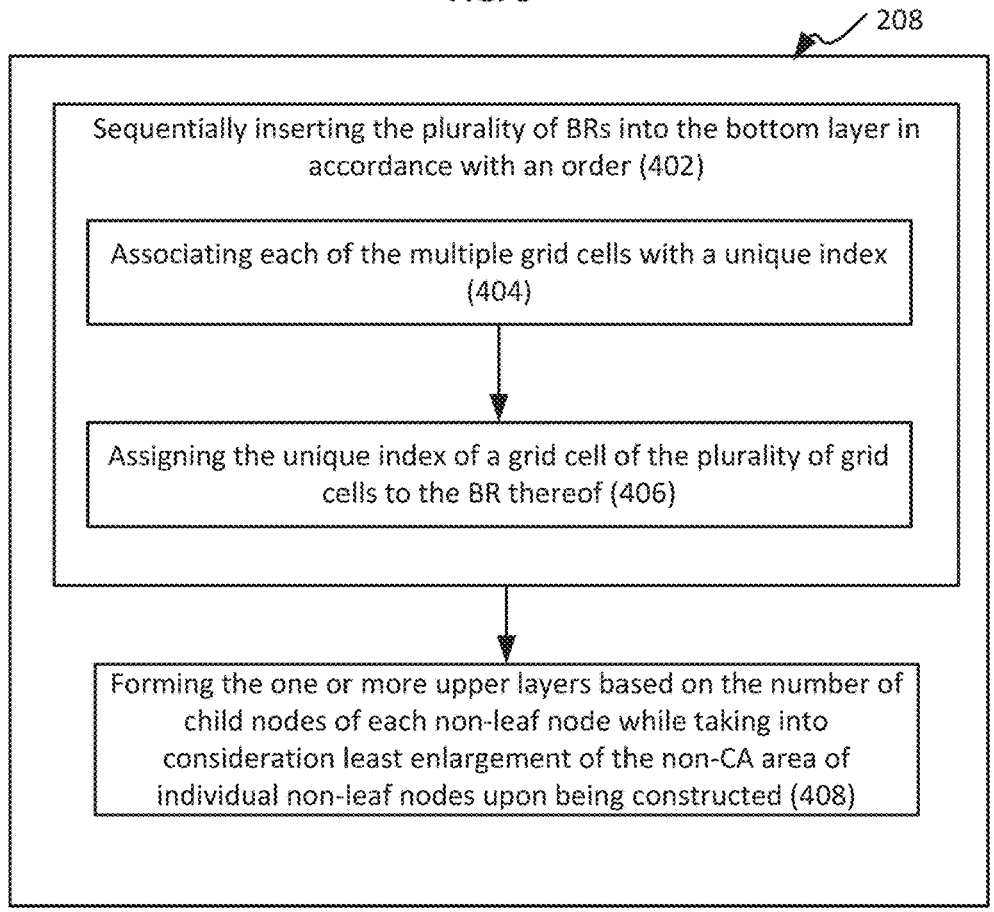
FIG. 4 illustrates a generalized flowchart of an exemplified process of constructing an R-tree in accordance with certain embodiments of the presently disclosed subject matter.

FIG. 4 illustrates a generalized flowchart of an exemplified process of constructing an R-tree in accordance with certain embodiments of the presently disclosed subject matter. As shown, the R-tree structure can be constructed by sequentially inserting (402) the plurality of BRs into the bottom layer of the R-tree in accordance with an order, and forming/constructing (408) the one or more upper layers of non-leaf nodes based on the number of child nodes of each non-leaf node, while taking into consideration least enlargement of the non-CA area covered by individual non-leaf nodes upon being constructed.

Purity of a node, or purity of a rectangle (either a BR or a compacted rectangle) represented by a node, is computed based on the area of the CAs enclosed in the rectangle, and the area of the rectangle. Purity can be used as an indication of the size of the non-CA area included in a rectangle. Least enlargement of the non-CA area can be reflected as obtaining a higher purity of the nodes/the compacted rectangles represented thereby.

In particular, the order for inserting the BRs into the bottom layer can be defined by associating (404) each of the multiple grid cells with a unique index, and assigning (406) the unique index of a grid cell of the plurality of grid cells to the BR thereof. Accordingly, the plurality of BRs can be inserted into the bottom layer in accordance with the unique index thereof. Various indexing for spatial sorting can be used for defining the inserting order. By way of example, the grid cells (and the BRs thereof) can be sorted in accordance with their x coordinates or y coordinates. By way of another example, the unique index can be a Hilbert index which is derived in accordance with a Hilbert curve traversing the plurality of grid cells.

A Hilbert curve is a continuous space-filling curve that is constructed as a set of piecewise linear curves. Its graph is a compact set, homeomorphic to the closed unit interval, with a Hausdorff dimension of 2. A Hilbert curve is useful since it gives a mapping between 1D and 2D space that preserves locality fairly well, and two data points which are close to each other in one-dimensional space are also close to each other after folding by the curve. A Hilbert curve can be used to impose a linear ordering on the rectangles according to the Hilbert index derived therefrom. The Hilbert index is based on the Hilbert value of the grid cells containing the BRs (e.g., the length of the Hilbert curve from the origin to the respective grid cells).

Figure 10:
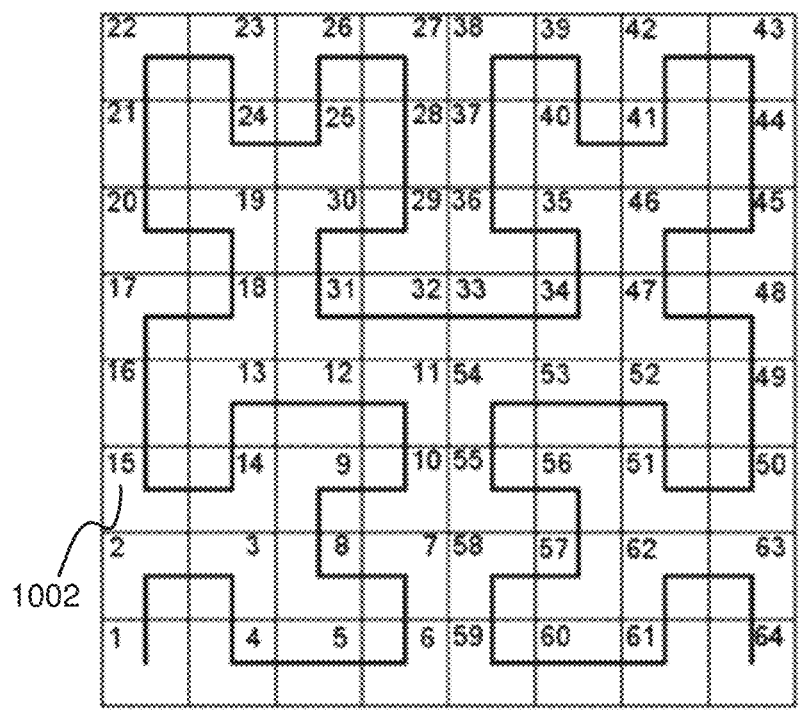
FIG. 10 illustrates an example of a Hilbert index derived from a Hilbert curve in accordance with certain embodiments of the presently disclosed subject matter.

FIG. 10 illustrates an example of Hilbert index derived from a Hilbert curve in accordance with certain embodiments of the presently disclosed subject matter. As shown, a Hilbert curve is illustrated as a set of piecewise linear curves that traverse the grid cells. Each grid cell is associated with a Hilbert index which is derived based on the Hilbert value of the grid cell (e.g., according to the length of the Hilbert curve from the origin to the grid cell). Any BR that falls within the grid cell is assigned with the Hilbert index of that cell. By way of example, cell 1002 and any BR thereof are assigned with a Hilbert index of 15, while its neighboring cells thereof are assigned with a Hilbert index of 13, 14 and 16. By using the right order of Hilbert curve (the Hilbert curve as illustrated in FIG. 10 is in the order of 3) in accordance with the grid size, each BR can be assigned with a unique Hilbert index. For instance, the order of the Hilbert curve as needed can be represented as: $\log_2(\max(\text{number of grid cells}))$.

Inserting the BRs into the bottom layer of the R-tree according to their Hilbert index can enable grouping rectangles that are close to each other together, thus minimizing the area of the resulting compacted rectangles (minimizing the entire area of the compacted rectangles is substantially equivalent to minimizing the non-CA area in the compacted rectangles). By way of example, assume each non-leaf node can have two child nodes, and assume, during construction, a compacted/grouped rectangle that is already formed will not be divided again upon later insertion of newer leaf nodes/BRs. BR 1 with index 1 (according to the Hilbert index shown in FIG. 10) is first inserted into the bottom layer as a leaf node, then BR 2 with index 2 is inserted, where BR 1 and BR 2 are compacted as a first (upper) layer node 1 (the exemplified BRs are not illustrated in FIG. 10 for conciseness of the figure). Assuming the grid cell with index 3 is empty (i.e., there is no BR in this cell), the next BRs to be inserted are BR 4 with index 4 and then BR 5 with index 5. These two BRs are thus grouped to a first layer node 2. Assuming there is only one more BR 8 with index 8 left to be inserted, considering BR 8 is closer to the first layer node 2, BR 8 and the first layer node 2 will be grouped to form a second layer node, which will then be grouped with the first layer node 1 to a third layer node. This way of grouping is more optimized than first grouping the BR 8 with the first layer node 1 which is farther from BR 8 than from the first layer node 2, thus would unavoidably result in a larger total area of the compacted rectangles. Therefore, when inserting new BRs and forming upper layer nodes, care is taken to ensure minimizing enlargement of the area covered by the compacted rectangles.

It is to be noted that the above example is described for simplicity and illustrative purposes only, and should not be construed to limit the present disclosure in any way. Other ways of forming upper layer nodes can be used in addition to or in lieu of the above. For instance, the number of child nodes of each non-leaf node can be configured, and the previously-formed upper nodes representative of compacted rectangles can be possibly divided again upon later insertion of newer BRs for the purpose of further optimizing (minimizing) the area to be included in the compacted rectangles.

Figure 11:
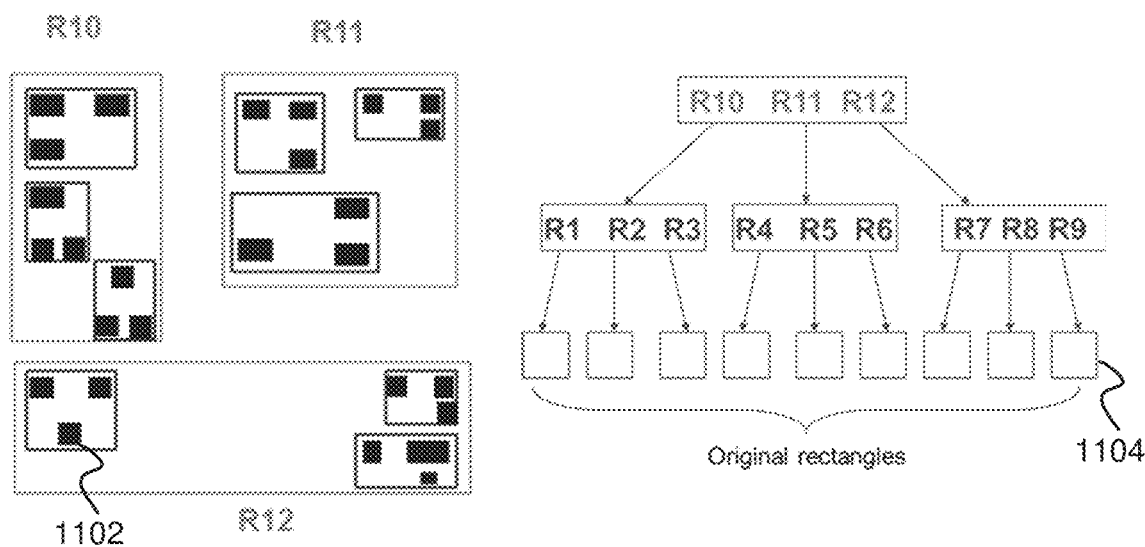
FIG. 11 illustrates an example of an R-tree and corresponding rectangles represented by the R-tree in accordance with certain embodiments of the presently disclosed subject matter.

FIG. 11 illustrates an example of an R-tree and corresponding rectangles represented by the R-tree in accordance with certain embodiments of the presently disclosed subject matter.

The black dots 1102 represent the bounding rectangles (BR) (also denoted as original rectangles) that are created as described with reference to FIG. 3. The BRs 1102 are inserted as leaf nodes 1104 into the bottom layer of the R-tree (not all the BRs are illustrated in the bottom layer due to the illustration limitation of the figure). The upper layers of the tree represent different levels of compaction of the BRs. As shown, the BRs are grouped into a first upper layer of R1-R9 in accordance with the construction process described above, e.g., based on the number of child nodes of each non-leaf node with the consideration of least enlargement of the area covered by the compacted rectangles. R1-R9 are further grouped into a second upper layer R10-R12 in a similar manner. The R10-R12 can be grouped into a root node if needed. The R-tree is constructed as described above and each non-leaf node of the tree is expected to cover minimal area/non-CA area upon being constructed.

According to certain embodiments, the R-tree structure can be constructed as a balanced binary tree in which each non-leaf node has at most two child nodes. The binary R-tree, which although may take longer to query the rectangles, can provide better purity as compared to an R-tree constructed with other number of child nodes (such as, e.g., three child nodes or more). In particular, since the R-tree is used specifically for the purpose of care area compaction in the present disclosure, rather than its conventional purpose of region querying, using a binary R-tree can be beneficial to minimize the non-CA area, thus improving the purity of the compacted rectangles.

Once the plurality of BRs are all inserted and the R-tree is constructed, a set of nodes can be selected (210) from the leaf nodes and the non-leaf nodes of the R-tree structure based on the predefined inspection capacity. The set of nodes is representative of the set of compacted rectangles.

Figure 5:
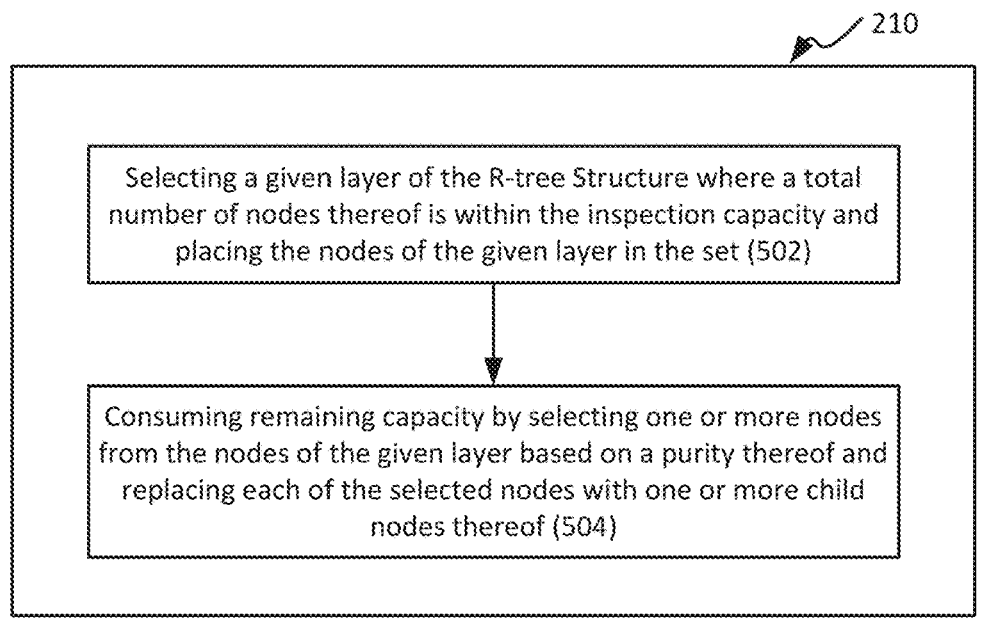
FIG. 5 illustrates a generalized flowchart of an exemplified process of selecting the set of nodes in accordance with certain embodiments of the presently disclosed subject matter.

FIG. 5 illustrates a generalized flowchart of an exemplified process of selecting the set of nodes in accordance with certain embodiments of the presently disclosed subject matter. Specifically, a given layer of the R-tree structure can be selected (502) where a total number of nodes thereof is within the inspection capacity, and the nodes of the given layer can be placed (temporarily) in the set. The remaining capacity (if any) can be consumed (504) by selecting one or more nodes from the nodes of the given layer based on a purity thereof, and replacing each of the selected nodes with one or more child nodes thereof. The nodes of the given layer except for the selected nodes, and the child nodes of the selected nodes, together constitute the set of nodes.

Figure 12:
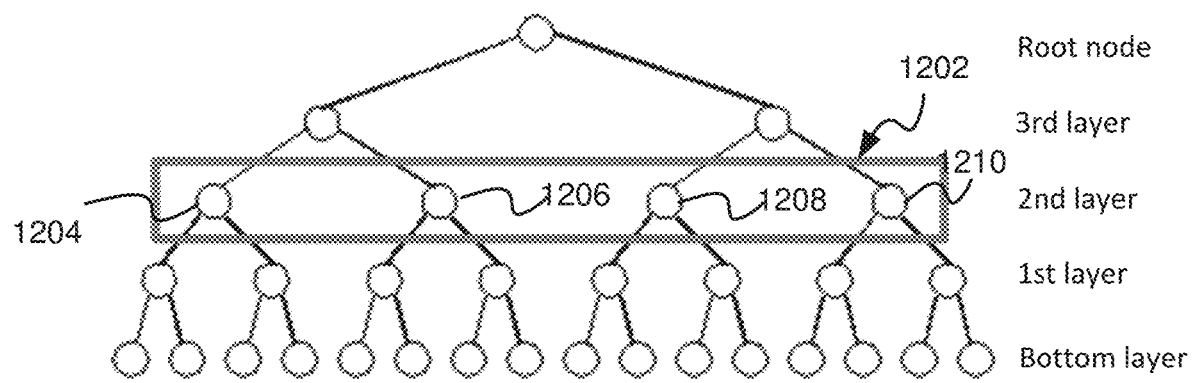
FIG. 12 illustrates an example of an R-tree with respect to node selection as described with reference to FIG. 5 in accordance with certain embodiments of the presently disclosed subject matter.

Referring now to FIG. 12, there is illustrated an example of an R-tree with respect to node selection as described with reference to FIG. 5 in accordance with certain embodiments of the presently disclosed subject matter.

Assume the inspection capacity of the inspection tool is predefined as 7 million rectangles that can be handled by the inspection tool due to tool limitations. The R-tree as exemplified comprises a bottom layer and four upper layers (including the top layer with a root node). Assume the bottom layer comprises 16 million rectangles (e.g., BRs), the first upper layer comprises 8 million rectangles, the second upper layer comprises 4 million rectangles, and the third upper layer comprises 2 million rectangles. Therefore, the number of nodes in the second upper layer (i.e., 4M) is right within the inspection capacity of 7M, since the next layer comprises a number of nodes (i.e., 8M) which already exceeds the capacity. The second upper layer is thus selected, and the nodes 1202 in the second upper layer can be temporarily placed in the set of nodes.

Since there is a remaining capacity of 3M from the inspection capacity, the remaining capacity can be consumed by selecting one or more nodes from the selected layer, e.g., based on a purity of the nodes in the selected layer. By way of example, purity of each node from the second upper layer can be computed, and the nodes can be ranked in accordance with their purity values. The first node with the lowest purity can be selected and replaced (from the set) by its child nodes (which have better purity than the first node). The next node with the lowest purity in the new set (the nodes from the second upper layer, except for the first node, which is now replaced by its child nodes) can be selected and replaced (from the new set) by its child nodes. The process can repeat until the remaining capacity of 3M is consumed. The set of nodes as eventually selected would comprise the nodes of the given layer except for the selected (and replaced) nodes, and the child nodes of the selected nodes.

For purpose of simplified exemplification, assume the inspection capacity is 7 (instead of 7M) while the second upper layer comprises 4 (instead of 4M) nodes as shown in the figure. The four nodes 1202 are first selected and placed in the set (as a temporary set). Since there is still a remaining capacity of 3 nodes, the purity of the four nodes 1202 is computed. Assuming node 1204 has the lowest purity among the four nodes, node 1204 is removed from the set and replaced by its two child nodes in the first upper layer. Now the set comprise 5 nodes, and there is still a remaining capacity of 2 nodes. Assuming node 1206 has the lowest purity among the 5 nodes in the set, node 1206 is removed from the set and replaced by its two child nodes in the first upper layer. Now the set comprises 6 nodes and there is still a remaining capacity of 1 node. Similarly, the next node 1208 (assumed to have a lowest purity) is replaced in the set by its two child nodes, thus making the set have 7 nodes and meeting the inspection capacity. The eventual set comprises the remaining node 1210 from the second upper layer and the child nodes of nodes 1204, 1206 and 1208.

The above example is merely for illustrative purposes and should not be construed to limit the present disclosure in any way. Different embodiments may utilize different detailed implementations. By way of example, when removing a node from the set, the replacing child nodes thereof can be the immediate child nodes in the lower layer, or, alternatively, the replacing child nodes can include all the leaf nodes thereof. For instance, in the above example, when removing node 1204, the replacing child nodes can be the four leaf nodes which are indirectly connected to the node 1204. By way of another example, the ranking of purity can be only within the nodes of the selected layer, or it can be within the new set including the replacing child nodes.

Figure 6:
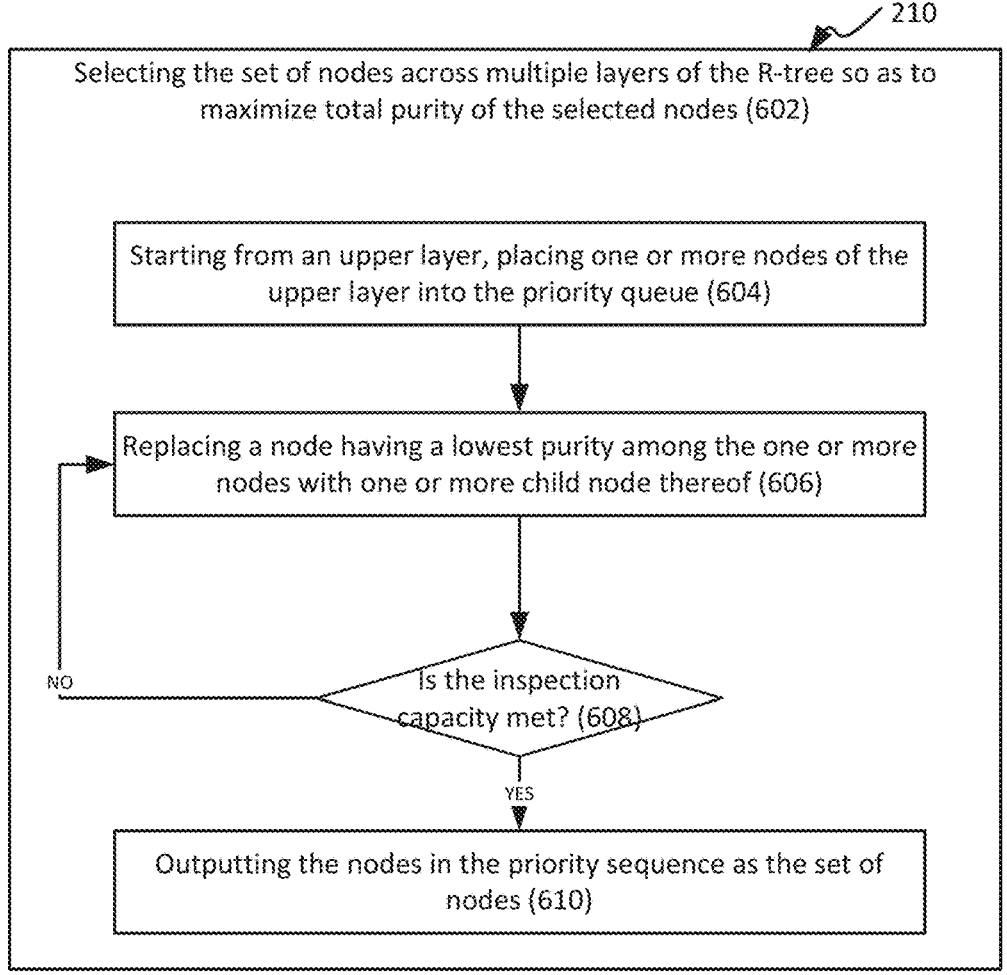
FIG. 6 illustrates a generalized flowchart of another exemplified process of selecting the set of nodes in accordance with certain embodiments of the presently disclosed subject matter.

Alternatively, instead of selecting a given layer, and then replacing certain nodes thereof to meet the inspection capacity, the set of nodes can be selected (602) across multiple layers of the R-tree so as to optimize (e.g., in an attempt to maximize) total purity of the selected set of nodes, as illustrated in FIG. 6 which shows a generalized flowchart of another exemplified process of selecting the set of nodes in accordance with certain embodiments of the presently disclosed subject matter. Similarly, the term "maximize" used herein should be construed to cover both the exact maximized condition, or a nearly maximized condition (to an extent).

Specifically, the set of nodes can be selected in an iterative manner using a priority queue. By way of example, starting from one of the upper layers, one or more nodes of the layer can be placed (604) into the priority queue. A node having the lowest purity among the one or more nodes can be replaced (606) from the priority queue with one or more child nodes thereof (e.g., its immediate child nodes). If the number of nodes in the priority queue does not meet (608) the inspection capacity, the replacing step 606 can be repeated until the number of nodes in the priority queue meets the inspection capacity. When the inspection capacity is met, the nodes in the priority queue can be outputted (610) as the set of nodes representative of the compacted rectangles.

Figure 13:
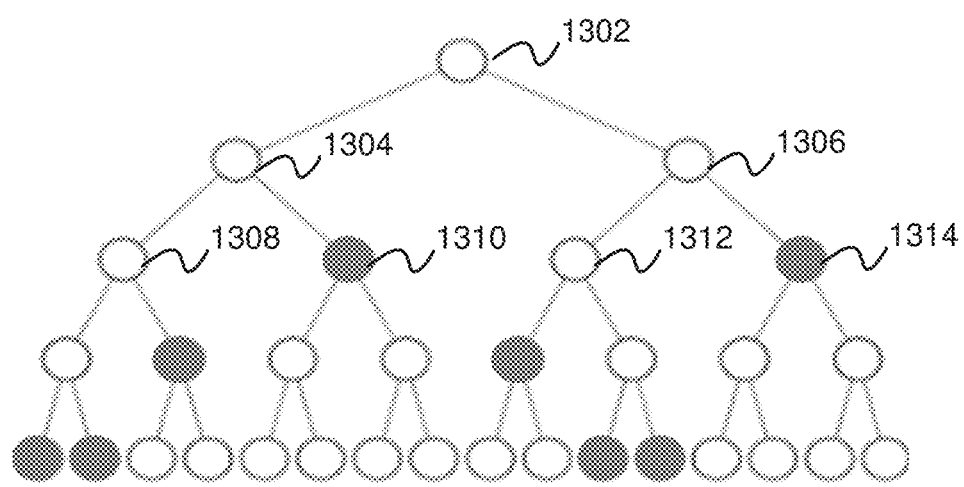
FIG. 13 illustrates an example of an R-tree with respect to node selection as described with reference to FIG. 6 in accordance with certain embodiments of the presently disclosed subject matter.

Referring now to FIG. 13, there is illustrated an example of an R-tree with respect to node selection as described with reference to FIG. 6 in accordance with certain embodiments of the presently disclosed subject matter.

By way of example, starting from the top layer, the root node 1302 is placed into a priority queue. Since there is only one node in the queue, this root node 1302 is replaced by its immediate child nodes 1304 and 1306. Assuming that the inspection capacity is 8, it is not met, since there are only two nodes in the queue. Node 1304, having a lower purity, is removed from the queue and is replaced by its immediate child nodes 1308 and 1310. Now three nodes are in the queue, which still does not meet the inspection capacity. Node 1306, having the lowest purity among the three, is replaced by its immediate child notes 1312 and 1314. This process can continue until the inspection capacity is met. As illustrated, eventually 8 nodes (marked as solid nodes) from different layers of the tree are selected, representing a set of compacted rectangles of which the total purity is optimized/maximized.

It is to be noted that the set of nodes can be selected in accordance with the process with reference to FIGS. 5 and 12 or the process with reference to FIGS. 6 and 13, or any suitable adaptation thereof. The present disclosure is not limited to a specific implementation thereof.

Once the compaction (206) is completed, and the second map informative of the set of compacted rectangles is generated, the second map can be used for filtering a defect map indicative of defect candidate distribution on the die. In some embodiments, optionally, the filtering can be performed by system 101. For instance, system 101 (e.g., the defect map filtering module 108 in the PMC 102) can be configured to obtain the defect map from the inspection tool 110, and filter (212) the defect map using the second map. In some other cases, the second map can be provided to the inspection tool 110 to be used by the tool to filter the defect map.

In some embodiments, the second map can be used as a mask to be applied on the defect map to indicate which defect candidates should be further reviewed. By way of example, the defect map can be filtered by aligning the second map with the defect map and extracting one or more defect candidates falling within the set of compacted rectangles to form a filtered defect map. The filtered defect map can be used for defect review by a review tool.

In further embodiments, the second map can be possibly used as masks to be applied on inspection images of the specimen and indicate which pixels of the images should be inspected.

Figure 9:
FIG. 9 illustrates an example of a second map informative of the set of compacted rectangles in accordance with certain embodiments of the presently disclosed subject matter.

FIG. 9 illustrates an example of a second map informative of the set of compacted rectangles in accordance with certain embodiments of the presently disclosed subject matter. As shown, the second map 900 comprises compacted rectangles 902 which enclose one or more care areas. As described above, the compacted rectangles unavoidably include empty spaces representing the non-CA areas. The tree construction process and node selection process, as described above, takes into consideration optimization of the non-CA areas during the process, in which efforts are made to minimize the size of the non-CA areas, so as to suppress false alarms/nuisances falling within such areas when using the second map to filter the defect map.

According to certain embodiments, the defect detection assisting process as described above with reference to FIGS. 2-6 can be included as part of an inspection recipe usable by system 101 and/or system 100 and/or the inspection tool 110 for online specimen inspection in runtime. Therefore, the presently disclosed subject matter also includes a system and method for generating an inspection recipe during a recipe setup phase, where the recipe comprises the steps as described with reference to FIGS. 2-6 (and various embodiments thereof). It is to be noted that the term "inspection recipe" should be expansively construed to cover any recipe that can be used for performing operations related to any kind of specimen examination as described above.

It is to be noted that examples illustrated in the present disclosure, such as, e.g., the R-tree structures, the various tree construction processes and node selection processes etc., as described above, are illustrated for exemplary purposes, and should not be regarded as limiting the present disclosure in any way. Other appropriate examples/implementations can be used in addition to, or in lieu of the above.

Among advantages of certain embodiments of the defect detection assisting process as described herein is enabling an efficient care area compaction by using a R-tree structure. The compaction can effectively meet the inspection capacity constraint of the inspection tool, while care is taken to attempt to minimize the non-CA areas, so as to reduce any false alarms/nuisances falling within these areas when using the compacted rectangles to filter the defect map.

In particular, the R-tree is constructed in a specific way to represent the care areas of a CA map and the compactions thereof. Both the tree construction process (e.g., by considering least enlargement of the area covered by the tree), as well as selection of the compacted rectangles from the tree (e.g., based on purity of the nodes) are specifically configured so as to optimize inclusion of the non-CA area (e.g., minimizing the size of the non-CA area) while meeting inspection capacity of the inspection tool.

It is to be understood that the present disclosure is not limited in its application to the details set forth in the description contained herein or illustrated in the drawings.

It will also be understood that the system according to the present disclosure may be, at least partly, implemented on a suitably programmed computer. Likewise, the present disclosure contemplates a computer program being readable by a computer for executing the method of the present disclosure. The present disclosure further contemplates a non-transitory computer-readable memory tangibly embodying a program of instructions executable by the computer for executing the method of the present disclosure.

The present disclosure is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

Those skilled in the art will readily appreciate that various modifications and changes can be applied to the embodiments of the present disclosure as hereinbefore described without departing from its scope, defined in and by the appended claims.

The invention claimed is:

1. A computerized system of assisting defect detection on a semiconductor specimen, the system comprising a processing and memory circuitry (PMC) configured to:
obtain a first map informative of multiple care areas (CAs) to be inspected on a die of the semiconductor specimen;
create a plurality of bounding rectangles (BRs) enclosing the multiple CAs; and
compact the plurality of BRs to a set of compacted rectangles to meet a predefined inspection capacity while attempting to minimize a non-CA area enclosed by the set of compacted rectangles, giving rise to a second map informative of the set of compacted rectangles, wherein the compacting comprises:
constructing an R-tree structure comprising a bottom layer and one or more upper layers, the bottom layer comprising a plurality of leaf nodes representative of the plurality of BRs, each of the one or more upper layers comprising one or more non-leaf nodes, each given non-leaf node representative of a compacted rectangle enclosing one or more rectangles represented by one or more child nodes of the given non-leaf node, and
selecting a set of nodes from the leaf nodes and the non-leaf nodes of the R-tree structure based on the predefined inspection capacity, the set of nodes representative of the set of compacted rectangles;
wherein the second map is usable for filtering a defect map indicative of defect candidate distribution on the die.

2. The computerized system according to claim 1, wherein the first map is derived based on design data of the die.

3. The computerized system according to claim 1, wherein the PMC is configured to create the plurality of BRs by dividing the first map into multiple grid cells in accordance with a grid, giving rise to a plurality of grid cells each containing at least one CA or part thereof, and for each grid cell of the plurality of grid cells, approximating a bounding rectangle (BR) enclosing the at least one CA or part thereof in the grid cell, giving rise to the plurality of BRs corresponding to the plurality of grid cells.

4. The computerized system according to claim 3, wherein the PMC is configured to construct the R-tree structure by sequentially inserting the plurality of BRs into the bottom layer in accordance with an order, and forming the one or more upper layers of non-leaf nodes based on a number of child nodes of each non-leaf node while taking into consideration least enlargement of the non-CA area covered by individual non-leaf nodes upon being constructed.

5. The computerized system according to claim 4, wherein the order is defined by associating each of the multiple grid cells with a unique index, and assigning the unique index of a grid cell of the plurality of grid cells to the BR thereof, and wherein the plurality of BRs are inserted into the bottom layer in accordance with the unique index thereof.

6. The computerized system according to claim 5, wherein the unique index is a Hilbert index derived in accordance with a Hilbert curve traversing the plurality of grid cells.

7. The computerized system according to claim 1, wherein the PMC is configured to select the set of nodes by: selecting a given layer of the R-tree where a total number of nodes thereof is within the inspection capacity, placing the nodes of the given layer in the set, consuming remaining capacity by selecting one or more nodes from the nodes of the given layer based on a purity thereof, and replacing each of the selected nodes from the set with one or more child nodes thereof, wherein the nodes of the given layer except for the selected nodes, and the child nodes of the selected nodes, constitute the set of nodes.

8. The computerized system according to claim 1, wherein the PMC is configured to select the set of nodes across multiple layers of the R-tree so as to optimize total purity of the selected set of nodes.

9. The computerized system according to claim 8, wherein the PMC is configured to select the set of nodes by: starting from an upper layer, placing one or more nodes of the upper layer into a priority queue, replacing a node having a lowest purity among the one or more nodes with one or more child nodes thereof, and repeating the replacing until a number of nodes in the priority queue meets the inspection capacity.

10. The computerized system according to claim 1, wherein the R-tree structure is a balanced binary tree in which each non-leaf node has at most two child nodes.

11. The computerized system according to claim 1, wherein the PMC is further configured to filter the defect map by aligning the second map with the defect map and extracting one or more defect candidates falling within the set of compacted rectangles to form a filtered defect map, wherein the filtered defect map is usable for defect review by a review tool.

12. A computerized method of assisting defect detection on a semiconductor specimen, the method performed by a processing and memory circuitry (PMC) and comprising:
obtaining a first map informative of multiple care areas (CAs) to be inspected on a die of the semiconductor specimen;
creating a plurality of bounding rectangles (BRs) enclosing the multiple CAs; and
compacting the plurality of BRs to a set of compacted rectangles to meet a predefined inspection capacity while attempting to minimize a non-CA area enclosed by the set of compacted rectangles, giving rise to a second map informative of the set of compacted rectangles, wherein the compacting comprises:
constructing an R-tree structure comprising a bottom layer and one or more upper layers, the bottom layer comprising a plurality of leaf nodes representative of the plurality of BRs, each of the one or more upper layers comprising one or more non-leaf nodes, each given non-leaf node representative of a compacted rectangle enclosing one or more rectangles represented by one or more child nodes of the given non-leaf node, and selecting a set of nodes from the leaf nodes and the non-leaf nodes of the R-tree structure based on the predefined inspection capacity, the set of nodes representative of the set of compacted rectangles;

wherein the second map is usable for filtering a defect map indicative of defect candidate distribution on the die.

13. The computerized method according to claim 12, wherein the creating comprises dividing the first map into multiple grid cells in accordance with a grid, giving rise to a plurality of grid cells each containing at least one CA or part thereof, and for each grid cell of the plurality of grid cells, approximating a bounding rectangle (BR) enclosing the at least one CA or part thereof in the grid cell, giving rise to the plurality of BRs corresponding to the plurality of grid cells.

14. The computerized method according to claim 13, wherein the constructing the R-tree structure comprises sequentially inserting the plurality of BRs into the bottom layer in accordance with an order, and forming the one or more upper layers of non-leaf nodes based on a number of child nodes of each non-leaf node, while taking into consideration least enlargement of the non-CA area covered by individual non-leaf nodes upon being constructed.

15. The computerized method according to claim 14, wherein the order is defined by associating each of the multiple grid cells with a unique index, and assigning the unique index of a grid cell of the plurality of grid cells to the BR thereof, and wherein the plurality of BRs are inserted into the bottom layer in accordance with the unique index thereof.

16. The computerized method according to claim 15, wherein the unique index is a Hilbert index derived in accordance with a Hilbert curve traversing the plurality of grid cells.

17. The computerized method according to claim 12, wherein the selecting the set of nodes comprises: selecting a given layer of the R-tree where a total number of nodes thereof is within the inspection capacity, placing the nodes of the given layer in the set, consuming remaining capacity by selecting one or more nodes from the nodes of the given layer based on a purity thereof, and replacing each of the selected nodes from the set with one or more child nodes thereof, wherein the nodes of the given layer, except for the selected nodes, and the child nodes of the selected nodes, constitute the set of nodes.

18. The computerized method according to claim 12, wherein the set of nodes is selected across multiple layers of the R-tree, so as to optimize total purity of the selected set of nodes.

19. The computerized method according to claim 18, wherein the selecting the set of nodes comprises: starting from an upper layer, placing one or more nodes of the upper layer into a priority queue, replacing a node having a lowest purity among the one or more nodes with one or more child nodes thereof, and repeating the replacing until a number of nodes in the priority queue meets the inspection capacity.

20. A non-transitory computer readable storage medium tangibly embodying a program of instructions that, when executed by a computer, cause the computer to perform a method of assisting defect detection on a semiconductor specimen, the method comprising:

obtaining a first map informative of multiple care areas (CAs) to be inspected on a die of the semiconductor specimen;

creating a plurality of bounding rectangles (BRs) enclosing the multiple CAs; and compacting the plurality of BRs to a set of compacted rectangles to meet a predefined inspection capacity while attempting to minimize a non-CA area enclosed by the set of compacted rectangles, giving rise to a second map informative of the set of compacted rectangles, wherein the compacting comprises:

constructing an R-tree structure comprising a bottom layer and one or more upper layers, the bottom layer comprising a plurality of leaf nodes representative of the plurality of BRs, each of the one or more upper layers comprising one or more non-leaf nodes, each given non-leaf node representative of a compacted rectangle enclosing one or more rectangles represented by one or more child nodes of the given non-leaf node, and selecting a set of nodes from the leaf nodes and the non-leaf nodes of the R-tree structure based on the predefined inspection capacity, the set of nodes representative of the set of compacted rectangles;

wherein the second map is usable for filtering a defect map indicative of defect candidate distribution on the die.

\* \* \* \* \*